(12) United States Patent
Akiyama

(10) Patent No.: US 8,049,906 B2
(45) Date of Patent: Nov. 1, 2011

(54) PRINT CONTROL UNIT, A CONTROL METHOD THEREOF, A PRINT CONTROL PROGRAM, AND A RECORDING MEDIUM FOR CONVERTING DOCUMENT DATA INTO PRINTING DATA

(75) Inventor: Chiaki Akiyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1031 days.

(21) Appl. No.: 11/276,721

(22) Filed: Mar. 10, 2006

(65) Prior Publication Data
US 2006/0209329 A1  Sep. 21, 2006

(30) Foreign Application Priority Data
Mar. 17, 2005  (JP) .................................. 2005-077641

(51) Int. Cl.
  *G06F 3/12* (2006.01)
(52) U.S. Cl. ....... 358/1.13; 358/1.1; 358/1.18; 358/1.14
(58) Field of Classification Search ............ 358/1.1, 358/1.13, 1.18, 1.14; 715/527
  See application file for complete search history.

(56) References Cited

U.S. PATENT DOCUMENTS

| | | | |
|---|---|---|---|
| 2004/0090644 A1* | 5/2004 | Nishikawa | 358/1.13 |
| 2004/0114184 A1* | 6/2004 | Sugiyama | 358/1.18 |
| 2004/0207859 A1* | 10/2004 | Kadoi et al. | 358/1.1 |

FOREIGN PATENT DOCUMENTS

| | | |
|---|---|---|
| JP | 2000-168166 | 6/2000 |
| JP | 2000-298564 | 10/2000 |
| JP | 2001-47676 | 2/2001 |
| JP | 2001-130082 | 5/2001 |
| JP | 2001-134394 | 5/2001 |
| JP | 2001-232889 | 8/2001 |
| JP | 2002-63000 | 2/2002 |
| JP | 2002-366322 | 12/2002 |
| JP | 2004-5241 | 1/2004 |
| JP | 2004-094955 | 3/2004 |
| JP | 2005-063099 | 3/2005 |

* cited by examiner

*Primary Examiner* — Benny Tieu
*Assistant Examiner* — Qian Yang
(74) *Attorney, Agent, or Firm* — Oblon, Spivak, McClelland, Maier & Neustadt, L.L.P.

(57) ABSTRACT

A print control unit, a control method of the print control unit, a print control program, and a computer readable recording medium are disclosed, The print control unit that performs print control of document data includes: an intermediate data generating unit for generating intermediate data containing print setup information of the document data, and drawing information for a printer to draw the document data; a setup screen display unit for causing a display unit to display a setup screen for setting up a common setup that is commonly applied to one or more sets of the intermediate data, which are objects to be displayed; a print setup unit for applying the common setup to each set of the intermediate data; and a printing data generating unit for generating printing data that can be processed by the printer based on the intermediate data.

12 Claims, 18 Drawing Sheets

JOB LIST

| NO. | JOB NAME | NUMBER OF PAGES | DOCUMENT INFORMATION | PRINTING INTERMEDIATE FILE | PRINT SETUP | IMAGE DATA LIST |
|---|---|---|---|---|---|---|
| 1 | JOB1 | 5 | A4 VERTICAL | FILE1 | SETUP1 | IMAGE DATA LIST 1 |
| 2 | JOB2 | 5 | A4 VERTICAL | FILE2 | SETUP2 | IMAGE DATA LIST 2 |
| 3 | JOB3 | 5 | A4 VERTICAL | FILE3 | SETUP3 | IMAGE DATA LIST 3 |

1521

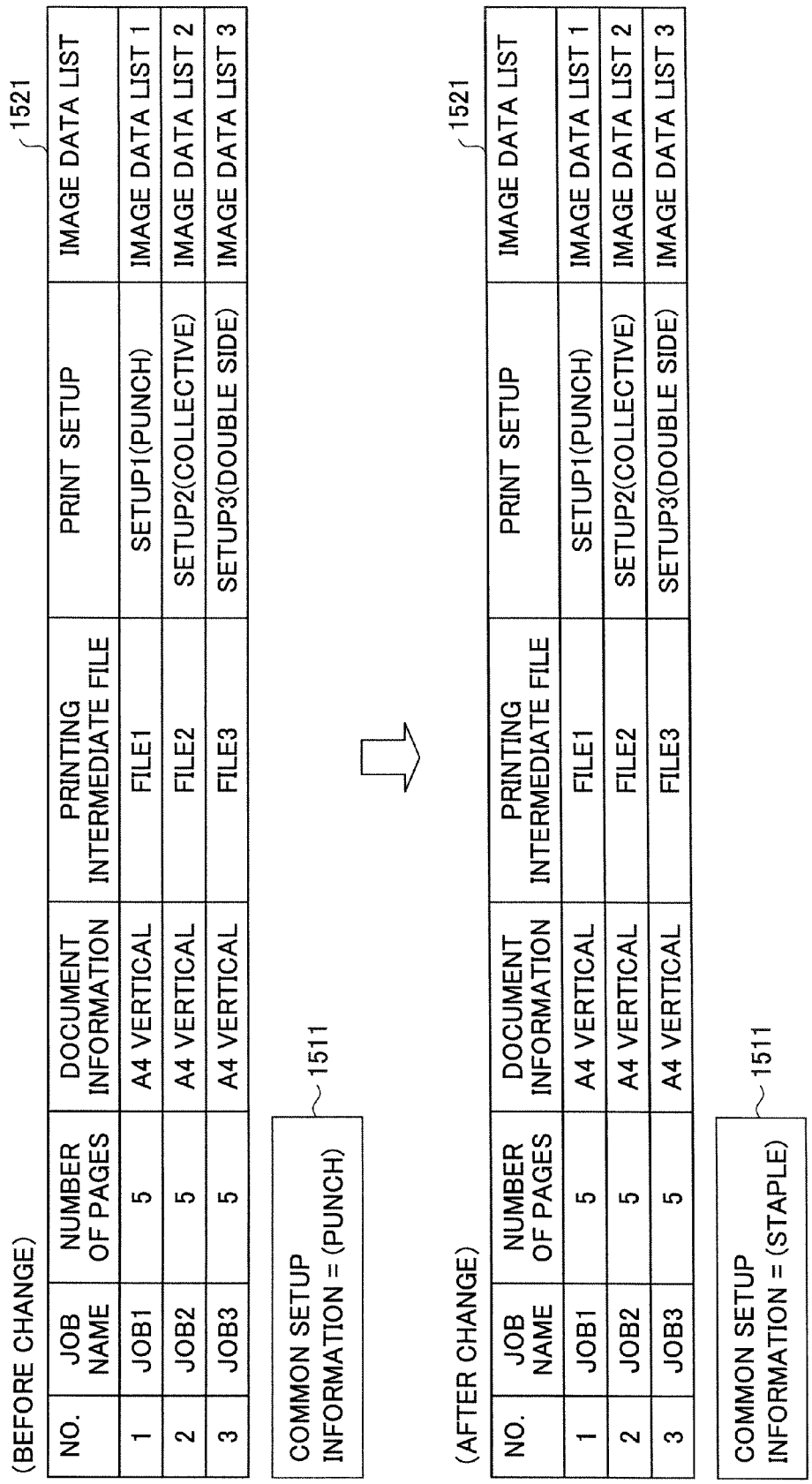

(BEFORE CHANGE)

(AFTER CHANGE)

(BEFORE CHANGE)

(AFTER CHANGE)

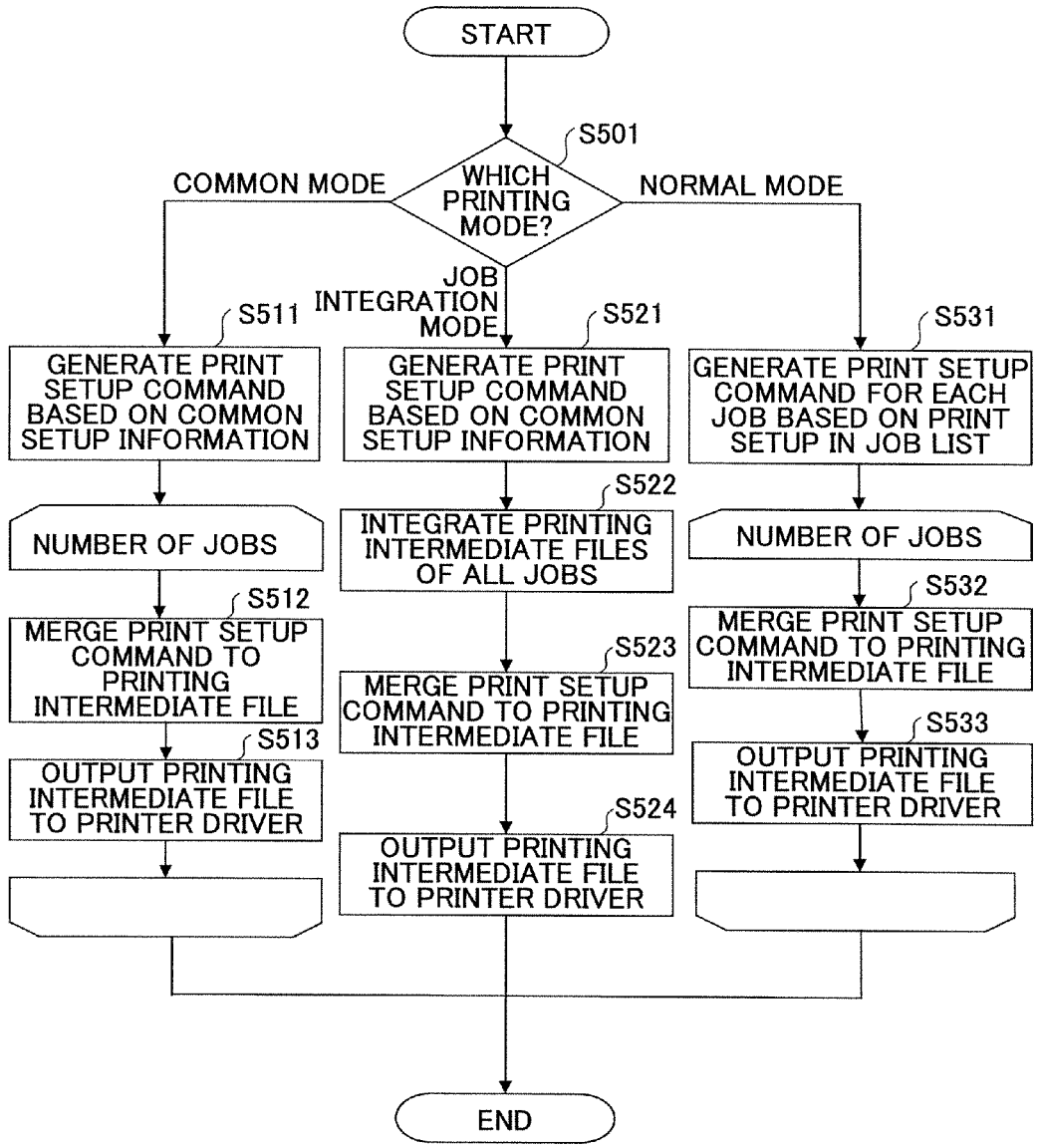

PRINT CONTROL UNIT, A CONTROL METHOD THEREOF, A PRINT CONTROL PROGRAM, AND A RECORDING MEDIUM FOR CONVERTING DOCUMENT DATA INTO PRINTING DATA

BACKGROUND OF THE INVENTION

1. Field of the Invention

The present invention generally relates to a print control unit, a control method thereof, a print control program, and a recording medium, and especially relates to a print control unit, a control method thereof, a print control program, and a recording medium for controlling a printing job of document data.

2. Description of the Related Art

Conventionally, a printer driver is available, the printer driver being capable of storing printing information of document data as an intermediate file in a data format that can be easily operated from other applications when printing of the document data is directed, in addition to outputting the printing information of the document data as printing data in, e.g., PDL form that can be interpreted by a printer.

Further, software that provides a GUI (Graphical User Interface) for displaying a print preview and performing a print setup of the stored intermediate file is available (for example, Patent Reference 1).

Using the software, a user can perform a print setup anew of two or more intermediate files (printing jobs), and can perform printing.

PATENT REFERENCE 1

JPA 2000-298564

DESCRIPTION OF THE INVENTION

Problem(s) to be Solved by the Invention

However, according to the conventional software, the print setup has to be performed for each of the printing jobs. That is, for example, when it is desired that the same print setup be applied to two or more printing jobs, the same operations have to be performed for each printing job, which poses a problem.

SUMMARY OF THE INVENTION

The present invention is made in view of the problem described above, and provides a print control unit, a control method thereof, a print control program, and a recording medium, whereby print setup work for two or more printing jobs is simplified, substantially obviating one or more of the problems caused by the limitations and disadvantages of the related art.

Features of the present invention are set forth in the description that follows, and in part become apparent from the description and the accompanying drawings, or may be learned by practice of the invention according to the teachings provided in the description. Problem solutions provided by an embodiment of the present invention are realized and attained by a print control unit, a control method thereof, a print control program, and a recording medium particularly pointed out in the specification in such full, clear, concise, and exact terms as to enable a person having ordinary skill in the art to practice the invention.

To achieve these solutions and in accordance with the purpose of the invention, as embodied and broadly described herein, an embodiment of the invention provides a print control unit, a control method thereof, a print control program, and a recording medium as follows.

Means for Solving the Problem

The printer control unit for performing print control of document data according to the embodiment of the present invention includes:

an intermediate data generating unit for generating one or more sets of intermediate data that include drawing information for a printer to draw document data, and print setup information of the document data;

a setup screen displaying unit for displaying a setup screen wherein one or more sets of the intermediate data are made an object of display (display object), and the same print setup is commonly applied to all the sets of the intermediate data;

a print setup unit for applying the print setup performed on the setup screen for all the sets of the intermediate data; and a printing data generating unit for generating printing data that can be processed by the printer based on the intermediate data.

According to the print control unit described above, the same print setup is made applicable to all desired/selected printing jobs in common using the setup screen. Therefore, the print setup work for two or more printing jobs is simplified.

In order to solve the problem, the embodiment of the present invention further provides a control method of the print control unit, a print control program for a computer to perform the control method of the print control unit, and a recording medium that stores the print control program.

Effect of the Invention

The present invention provides a print control unit, a control method of the print control unit, a print control program, and a recording medium that simplify the print setup work when carrying out two or more printing jobs.

BRIEF DESCRIPTION OF THE DRAWINGS

FIG. 6 is a screen display of an example of the printing job management screen when a job edit tab is selected;

FIG. 7 is a table showing an example of a job list;

FIG. 12 gives tables showing changes of the job list and common setup information when the print setup is changed in a common setup mode and a job integration mode;

FIG. 18 is a flowchart of a printing process.

DESCRIPTION OF THE PREFERRED EMBODIMENTS

Figure 1:
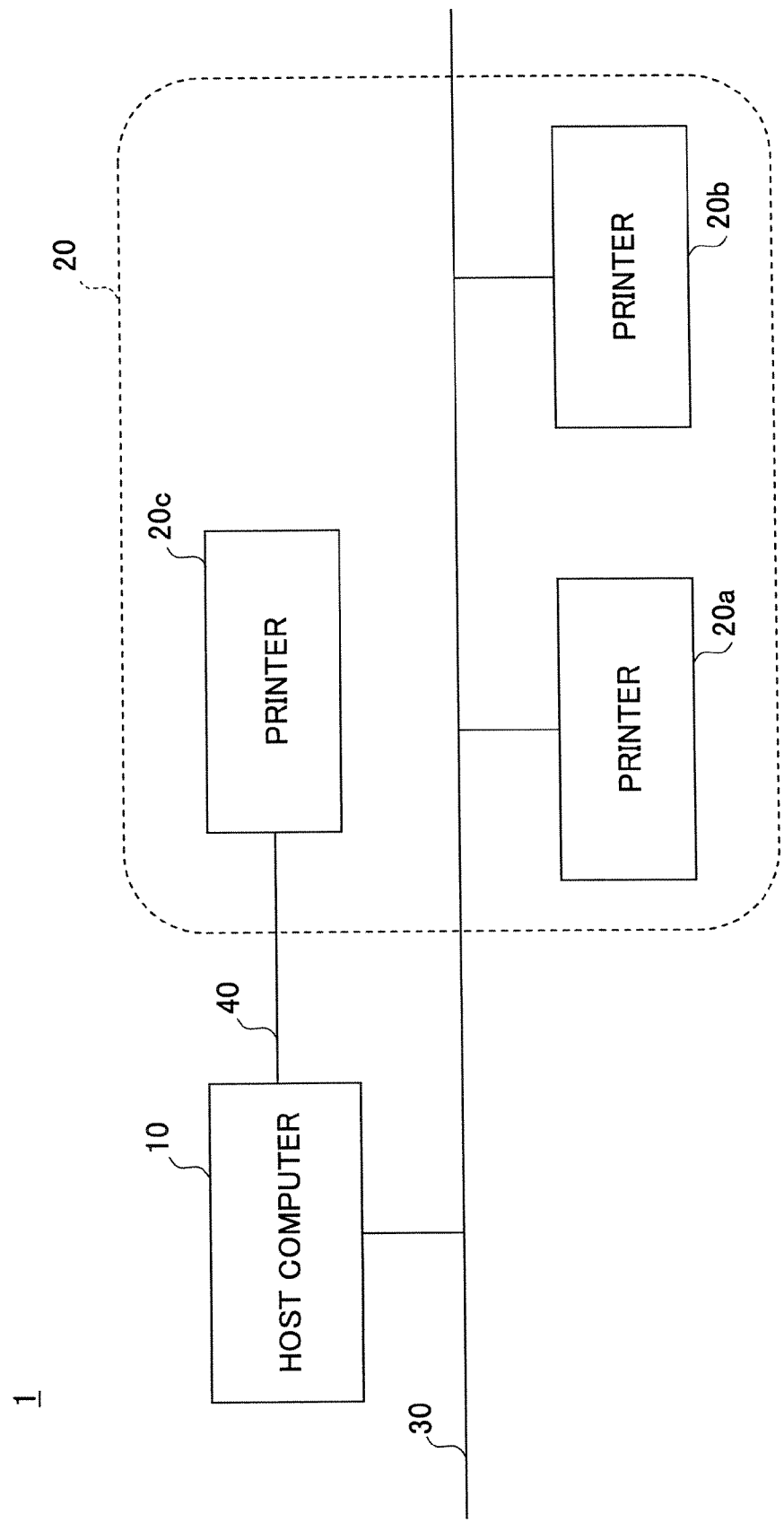
FIG. 1 is a block diagram showing an example of a print system according to the embodiment of the present invention.

In the following, an embodiment of the present invention is described with reference to the accompanying drawings. FIG. 1 shows an example of a print system 1 according to the embodiment of the present invention. The print system 1 includes a host computer 10, and printers 20a, 20b, and 20c, which are generically referred to as the printer 20.

The printer 20 is a common printer and performs a printing process according to directions from the host computer 10. In this example, the printers 20a and 20b are connected to the host computer 10 by a network 30 such as a LAN (Local Area Network), which may be a wired network or a wireless network; and the printer 20c is connected to the host computer 10 by a cable 40, such as a RS-232C cable and a USB cable.

The host computer 10 is for controlling a printing job of document data according to directions of a user. Here, the host computer 10 is a PC (personal computer); however, a terminal, such as a PDA (Personal Digital Assistant) and a cellular phone, can be used as the host computer 10. The host computer 10 executes various kinds of software on an OS (Operating System) such as Windows (registered trademark).

Figure 2:
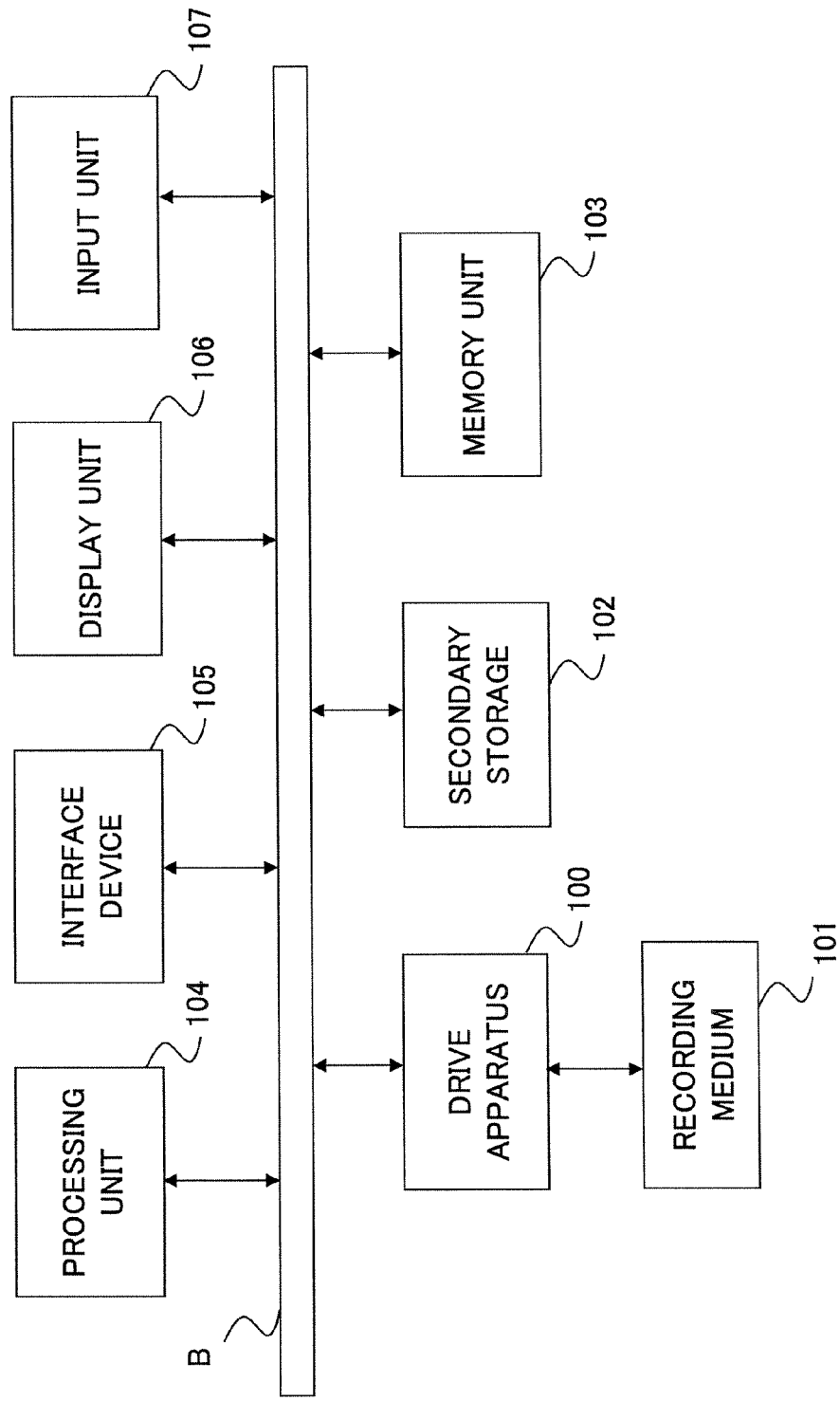
FIG. 2 is a block diagram showing an example of hardware configuration of a host computer according to the embodiment of the present invention.

FIG. 2 shows an example of hardware configuration of the host computer 10 according to the embodiment of the present invention. The host computer 10 includes a drive apparatus 100, a secondary storage 102, a memory unit 103, a processing unit 104, an interface device 105, a display unit 106, and an input unit 107, which are mutually connected by a bus B.

A program for the host computer 10 to carry out a process is provided by a recording medium 101, such as CD-ROM. When the recording medium 101 containing the program is loaded in the drive apparatus 100, the program is installed in the secondary storage 102 through the drive apparatus 100 from the recording medium 101. In addition, the secondary storage 102 stores required files, required data, etc.

When a direction to start the program is provided, the memory unit 103 reads and temporarily stores the program from the secondary storage 102. The processing unit 104 carries out functions of the host computer 10 according to the program stored in the memory unit 103. The interface device 105 is for interfacing with the network 30 that is shown in FIG. 1. The display unit 106 is for displaying information from the GUI (Graphical User Interface), and the like according to the program. The input unit 107 includes a keyboard, a mouse, and the like such that the user can provide operational directions.

Here, it is not a prerequisite that the program be installed from the recording medium 101; the program may be downloaded from another computer through a network such as the network 30.

Figure 3:
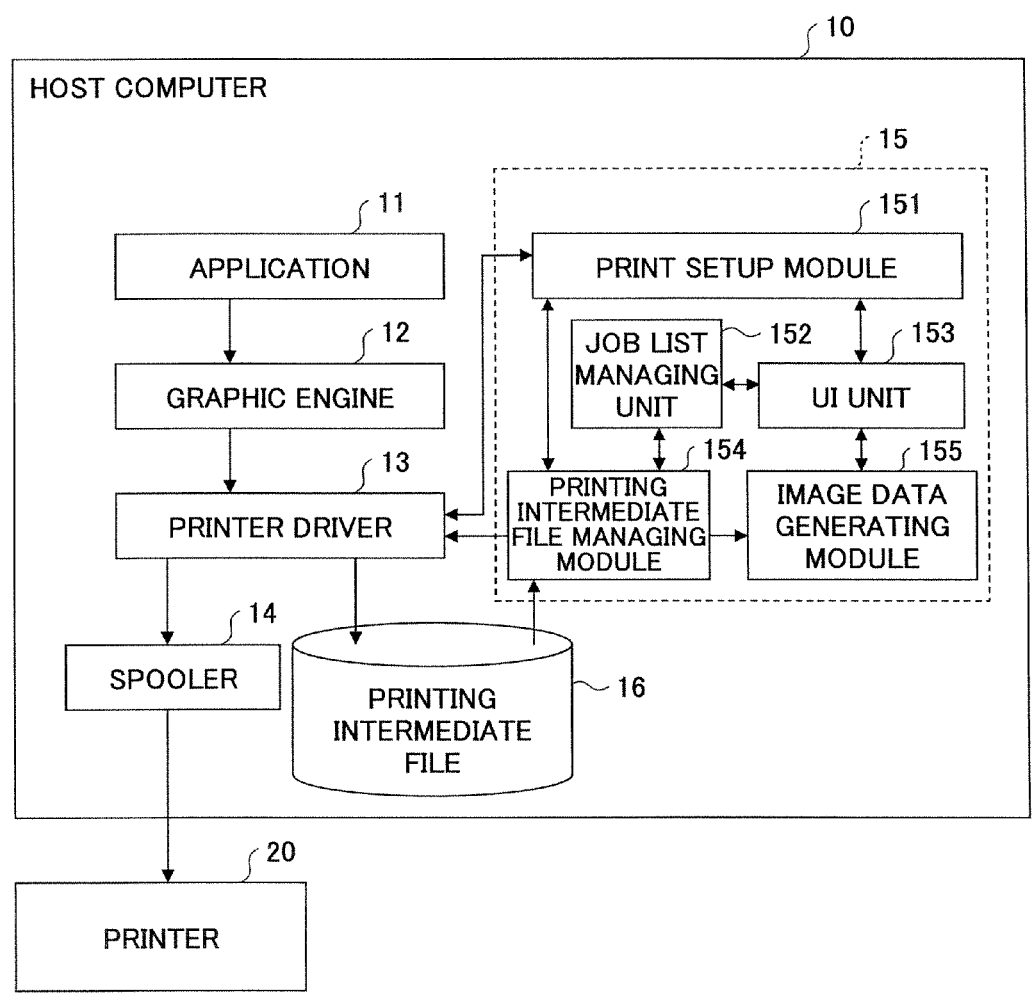
FIG. 3 is a block diagram showing an example of functional configuration of print control functions of the host computer according to the embodiment of the present invention.

FIG. 3 shows an example of functional configuration of the print controlling functions of the host computer 10 according to the embodiment of the present invention. The host computer 10 has an application 11, a graphics engine 12, a printer driver 13, a spooler 14, and a printing job managing module 15 for handling the document data and controlling a printing job.

The application 11 is a general purpose application such as word-processing software and spreadsheet software for generating information such as document data for the printers 20 to print. The graphic engine 12 provides the application 11 with a function interface for drawing that absorbs the difference (provides conversion) between devices, such as a printer and a display.

The graphics engine 12 responds to a function call from the application 11, and converts the document data into data in application-independent form (for example, in EMF). The converted data, which are called drawing data, are provided to the printer driver 13. The graphics engine 12 is provided by an OS (Operating System) such as Windows (registered trademark), in which case, GDI (Graphics Device Interface) provides the graphic engine 12.

The printer driver 13 converts the drawing data provided by the graphics engine 12 into printing data in a form (for example, PDL (Page Description Language)) that the printer (printer 20), which corresponds to the printer driver 13, can interpret/process. However, according to the embodiment, the printer driver 13 generates data called printing intermediate data in the process of converting the drawing data into the printing data, the printing intermediate data being one step after the drawing data and before the printing data, and the printer driver 13 stores the printing intermediate data as a printing intermediate file 16.

Figure 4:
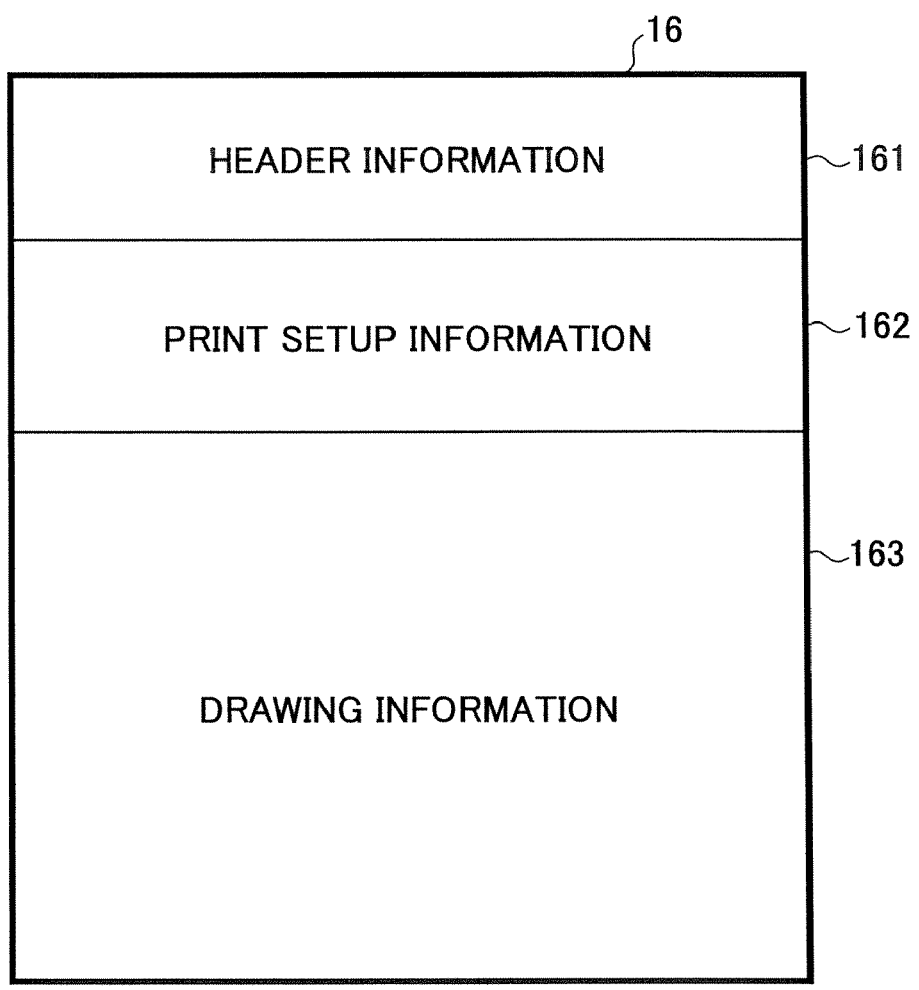
FIG. 4 is a data map showing an example of an outline of a data format for printing intermediate data according to the embodiment of the present invention.

FIG. 4 shows an example of a data format of the printing intermediate file according to the embodiment of the present invention. With reference to FIG. 4, one printing intermediate file 16 includes header information 161, print setup information 162, and drawing information 163. The header information contains various kinds of information about the printing intermediate file, similar to header information of files in various data formats. The print setup information 162 includes information wherein a print setup command is described in, e.g., PJL (Printer Job Language). The drawing information 163 is for the printer to draw the document data. When the document data consist of two or more pages, the drawing information for the pages is included.

Here, the printing intermediate file 16 does not have to be in the form described above; but rather, other forms can be used as long as the print setup information and the drawing information can be distinguished. For example, a printing intermediate file may be generated for every page where the document data contain two or more pages.

In addition, the word "file" may usually represents data that are stored on a file system provided by OS; however, in order to avoid complications in the descriptions here, the word "printing intermediate file" is used whether the data thereof are stored in the memory, or stored by the file system.

Further, according to the embodiment, "printing job" means a unit of a process for the printer to perform a printing process as one set of document data. Accordingly, a printing direction of the user basically corresponds to a printing job on a one-to-one basis. Further, when one printing intermediate file is generated based on one set of document data, the printing job basically corresponds to a printing intermediate file 16 on a one-to-one basis; and when a printing intermediate file is generated for every page, the printing job corresponds to one or more printing intermediate files according to the number of pages.

The printing job managing module 15 reads the printing intermediate file 16 generated by the printer driver 13, and provides a GUI (Graphical User Interface) for displaying a printing image (preview screen) of each printing job and for performing print setup ("printing job management screen"). The printing job managing module 15 includes a print setup module 151, a job list managing unit 152, a UI unit 153, a printing intermediate file managing module 154, and an image data generating module 155.

The UI unit 153 controls display of the printing job management screen, and controls input to the printing job management screen by the user.

Figure 5:
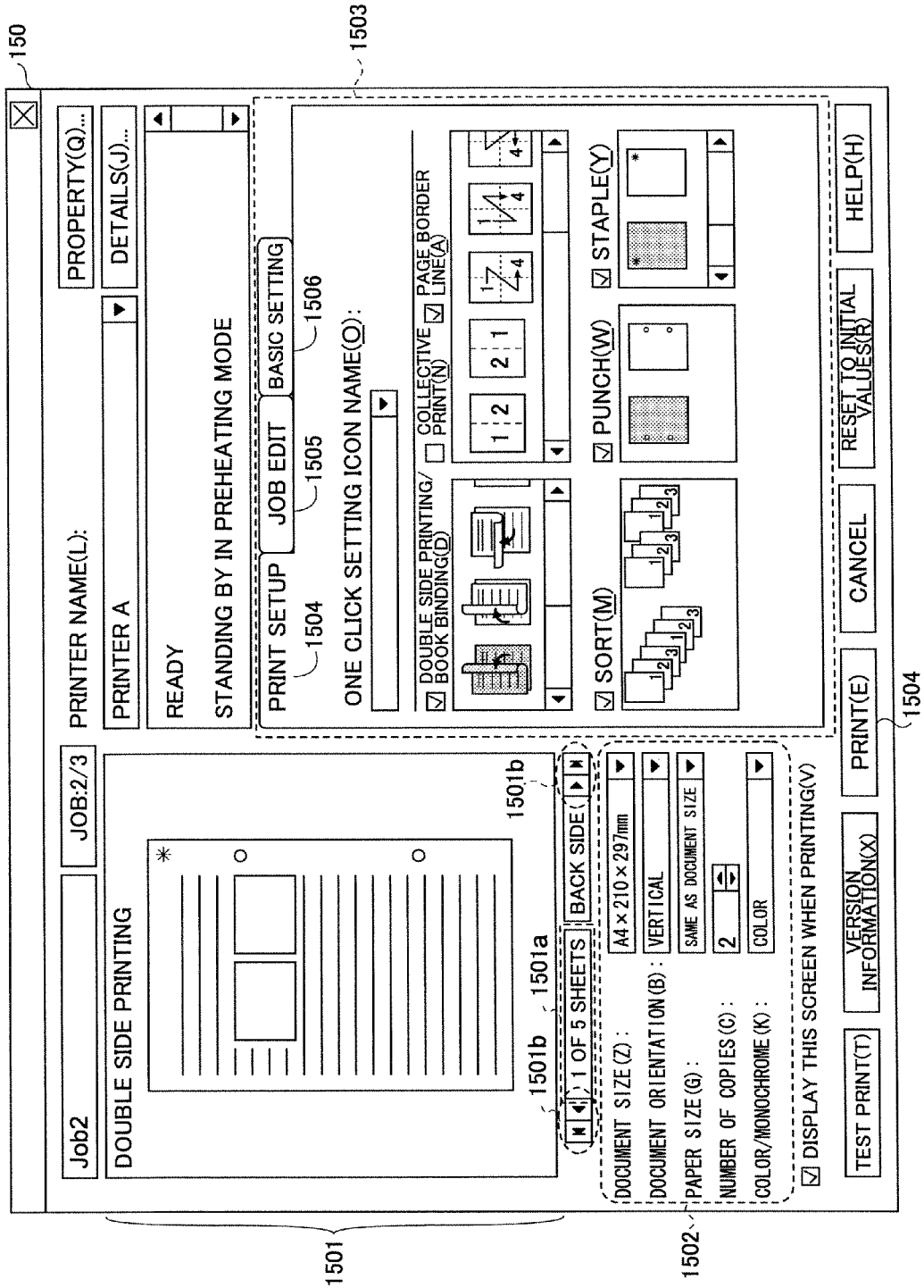
FIG. 5 is a screen display of an example of a printing job management screen.

FIG. 5 shows an example of a printing job management screen 150 that includes a preview display area 1501, a basic setting area 1502, and a details setting area 1503, wherein the information contained in the printing intermediate file 16, such as the print setup information 162 and the drawing information 163, is displayed such that the user can perform print setup for a printing job.

The preview display area 1501 displays image data expressing a printing image of a desired page (image data) of a printing job that is currently being handled (current job) in the printing job management screen 150. The preview display area 1501 includes a page number viewing area 1501a wherein a current page number is displayed with a total number of pages in a style such as "current page number/total number of pages". The example of FIG. 5 shows "1/5" indicating that the first page of 5 pages is being displayed. Further, page turning buttons 1501b are provided for turning the page over.

The basic setting area 1502 is for setting up basic items of the print setup information. In the example of FIG. 5, document size, document orientation, print sheet size, number of copies, and color/monochrome are selected.

The details setting area 1503 is for setting up other details, and includes a print setup tab 1504, a job edit tab 1505, and a basic setting tab 1506. FIG. 5 shows that the print setup tab 1504 is selected. With the print setup tab 1504 being opened, selections are made mainly about after-processes such as double-sided printing and bookbinding, collective printing, sorting, punching, and stapling.

Figure 6:
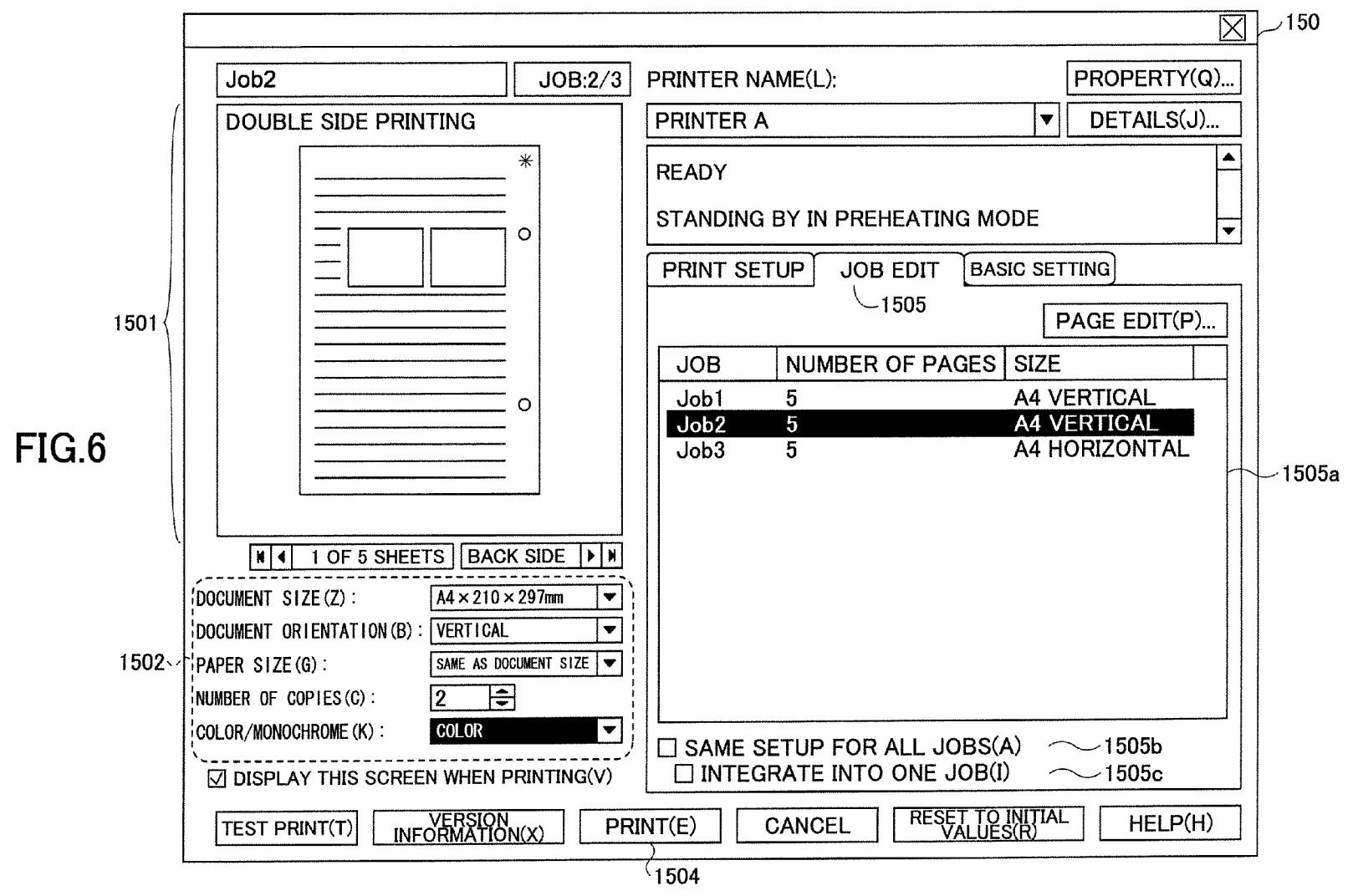

FIG. 6 shows an example of the printing job management screen when the job edit tab 1505 is selected. In FIG. 6, the job edit tab 1505 includes a job list display area 1505a, a common setup button 1505b, and a job integration button 1505c.

The job list display area 1505a is for displaying a list of printing jobs. A printing job selected in the job list area 1505a is made into the current job. Further, in the job list display area 1505a, change of the turn (change of the order of processing) of a printing job, deletion of a printing job, integration of printing jobs, and the like can be performed.

The common setup button 1505b is a check button for selecting whether the same print setup (common setup) is to be applied to all the printing jobs currently displayed in the job list area 1505a. That is, if the common setup button 1505b is checked, the common set up is applied to all the printing jobs currently displayed.

The job integration button 1505c is a check button for selecting whether all the printing jobs currently displayed on the job list area 1505a are to be integrated into one printing job. That is, if the job integration button 1505c is checked, all the printing jobs are treated as one printing job.

In the following, when the common setup button 1505b is checked, it is called "common setup mode", and when the job integration button 1505c is checked it is called "job integration mode". Further, when neither of the buttons is checked it is called "normal mode". Furthermore, according to the embodiment, differentiating among the common setup mode, the job integration mode, and the normal mode is called "printing mode".

In addition, alternatives for each print setup item that can be selected after selecting a setup by the user are realizable by data exchange between the print setup module 151 and the printer driver 13 as described below.

With reference back to FIG. 3, the printing intermediate file managing module 154 is for acquiring and managing the printing intermediate file 16. The print setup module 151 is for taking out and managing the print setup information 162 from the printing intermediate file 16.

The job list managing unit 152 is for managing the list of the printing jobs (a job list 1521) in the memory. The job list display area 1505a displays the screen based on the job list 1521.

FIG. 7 shows an example of the job list 1521. Information management of each printing job is performed using the job list 1521 for items such as "No.", job name, number of pages, document information, printing intermediate file, print setup, and image data list. Here, "No." is the turn of the printing job. The job name is the name of the printing job, the job name usually being the same as the file name of the document data that are the objects of the printing job. The number of pages is the number of pages of the document data. Document information includes information about the document size, an orientation, etc., of the document data. The printing intermediate file represents information associated with the printing intermediate file 16 (for example, the file name). Print setup represents information associated with the print setup information (such as the file name and a pointer). The image data list represents information associated with the image data (such as the file name and a pointer).

The image data generating module 155 is for generating the image data based on the drawing information 163 on the printing intermediate file 16. A preview screen is displayed using the image data generated by the image data generating module 155. In addition, according to the embodiment, the image data generating module 155 generates the image data for every page, and stores the image data as a file (image file). Here, an image file may be generated for every set of document data.

Figure 8:
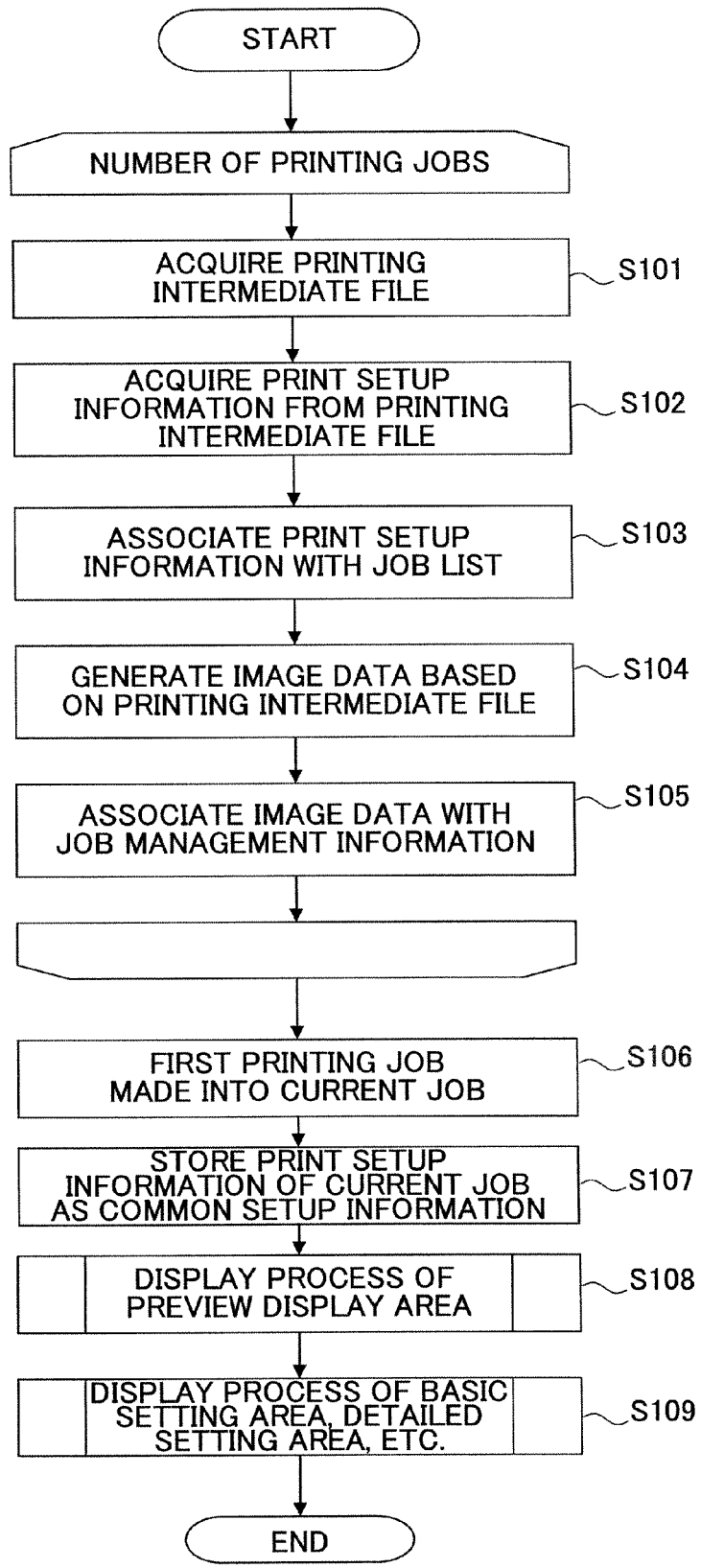
FIG. 8 is a flowchart of a starting process of a printing job managing module.

In the following, a process carried out by the host computer 10 shown in FIG. 3 is described. FIG. 8 is a flowchart of a starting process carried out by the printing job managing module 15. For example, if the user directs printing of the document data using the application 11, the printer driver 13 generates the printing intermediate file 16, and then the printing job managing module 15 is started. Further, the user may start the printing job managing module 15 asynchronously, i.e., independent of the printing direction from the application 11.

Steps S101 through S105 constitute a loop process for every printing job. At S101, the printing intermediate file managing module 154 acquires the printing intermediate file 16 of a printing job (current printing intermediate file). At S102, the print setup module 151 extracts the print setup information 162 from the current printing intermediate file, and associates the print setup information 162 with the job list 1521 at S103.

The image data generating module 155 extracts the drawing information 163 from the current printing intermediate file, and generates image data based on the drawing information 163 at S104. The image data generating module 155 associates the generated image data with the job list 1521 at S105. Here, since the image data are generated for every page, strictly speaking, the list information of the image data is associated with the job list 1521.

When the loop process as described above is carried out for all the printing jobs stored, the printing job at the top in the job list 1521 is made the current job (S106).

The print setup module 151 stores the print setup information of the current job in the memory as the common setup information. The common setup information is the print setup information to be applied in common to all printing jobs in the common setup mode. The print setup module 151 manages the memory storage for storing the common setup information.

Then, the UI unit 153 displays the printing job management screen 150; performs a display process of the preview display area 1501 (S108); and performs a display process of the basic setting area 1502, the details setting area 1503, and the like (S109).

Details of the display process of the preview display area 1501 (S108); and the display process of the basic setting area 1502, the details setting area 1503, and the like follow.

Figure 9:
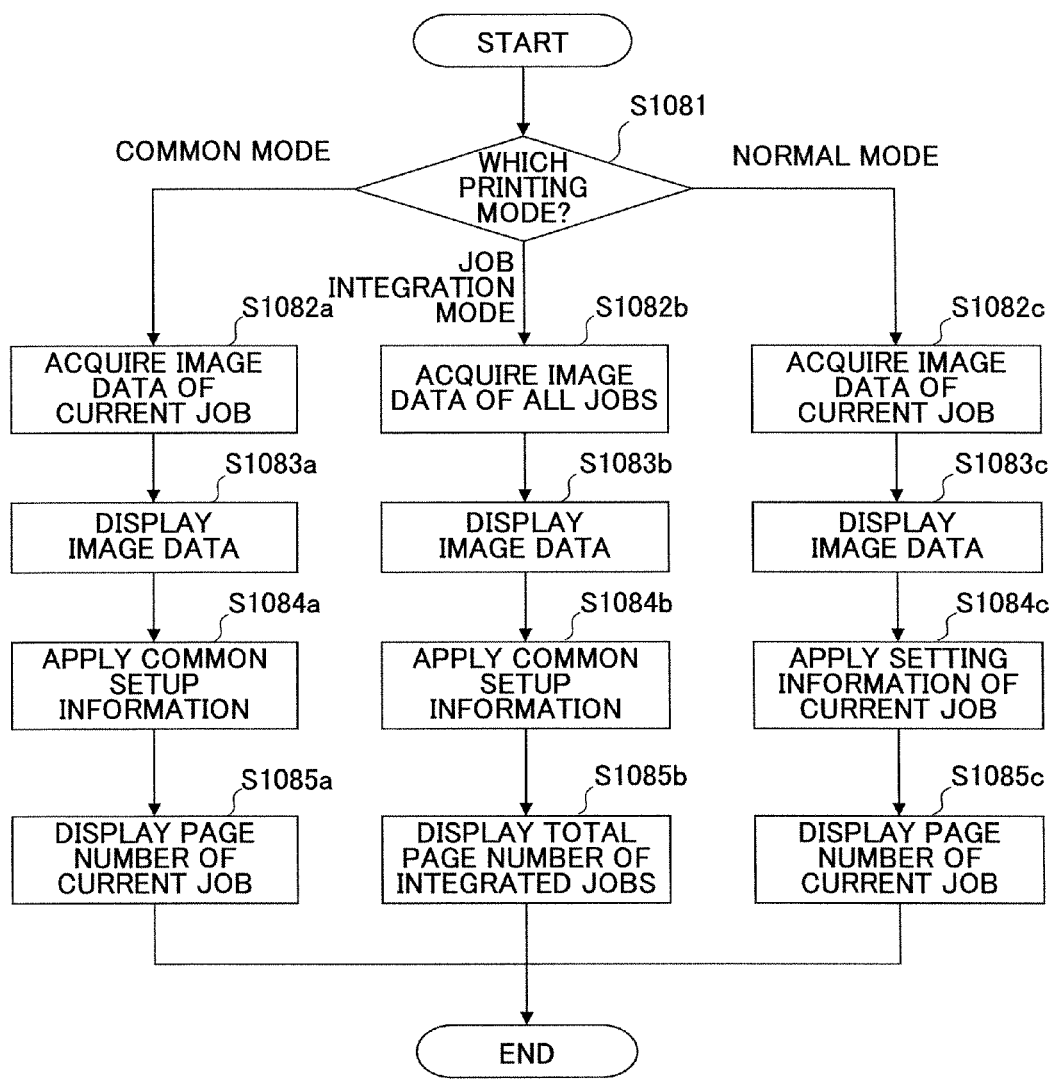
FIG. 9 is a flowchart of a display process of a preview display area.

FIG. 9 is a flowchart of the display process of the preview display area. The UI unit 153 determines the printing mode (S1081). Determination of the printing mode can be carried out by assigning a flag variable to each of the common setup mode, the job integration mode, and the normal mode; and by determining the value of the flag variable. Here, it is possible to arrange a default such that the normal mode is always set up when starting the printing job managing module 15; and, alternatively, it is possible to arrange a default such that the last mode selected is set up when starting the printing job managing module 15.

If the printing mode is determined to be the common setup mode, the UI unit 153 acquires the image data of the current job (S1082a), and displays the image data of the current job in the preview display area 1501 (S1083a). Therefore, by the preview display area 1051, pages can be turned only for the pages of the current job in this case.

Then, the UI unit 153 applies the common setup information to the image data displayed on the preview display area 1501 (S1084a). For example, when punching and stapling are to be carried out, corresponding signs are superimposed on the image data, and are displayed. Then, the UI unit 153 displays the total number of pages of the current job, and the present page number in the page display area 1501a.

In the case that the printing mode is determined to be the job integration mode, the UI unit 153 acquires the image data of all printing jobs (S1082b), and displays them in the preview display area 1501 (S1083b). Therefore, in the preview display area 1051, continuous page turning over can be performed for the pages throughout the jobs in this case as if all the jobs constitute one document.

Then, the UI unit 153 applies the common setup information to the image data displayed on the preview display area 1501 (S1084b); and displays the total number of pages of all the printing jobs, and the present page number of the pages of all the jobs in the display area 1501a (S1085b).

In the case that the printing mode is determined to be the normal mode, the UI unit 153 acquires the image data of the current job (S1082c), and displays the image data in the preview display area 1501 (S1083c). Therefore, by the preview display area 1051, page turning over can be performed only for the pages of the current job.

Then, the UI unit 153 applies the print setup information of the current job to the image data displayed on the preview display area 1501 (S1084c); and displays the total number of pages of the current job, and the present page number in the page display area 1501a (S1085c).

In addition, the process shown in FIG. 9 is performed not only at the time of starting, but also when the current job is changed and when the print setup is changed.

Figure 10:
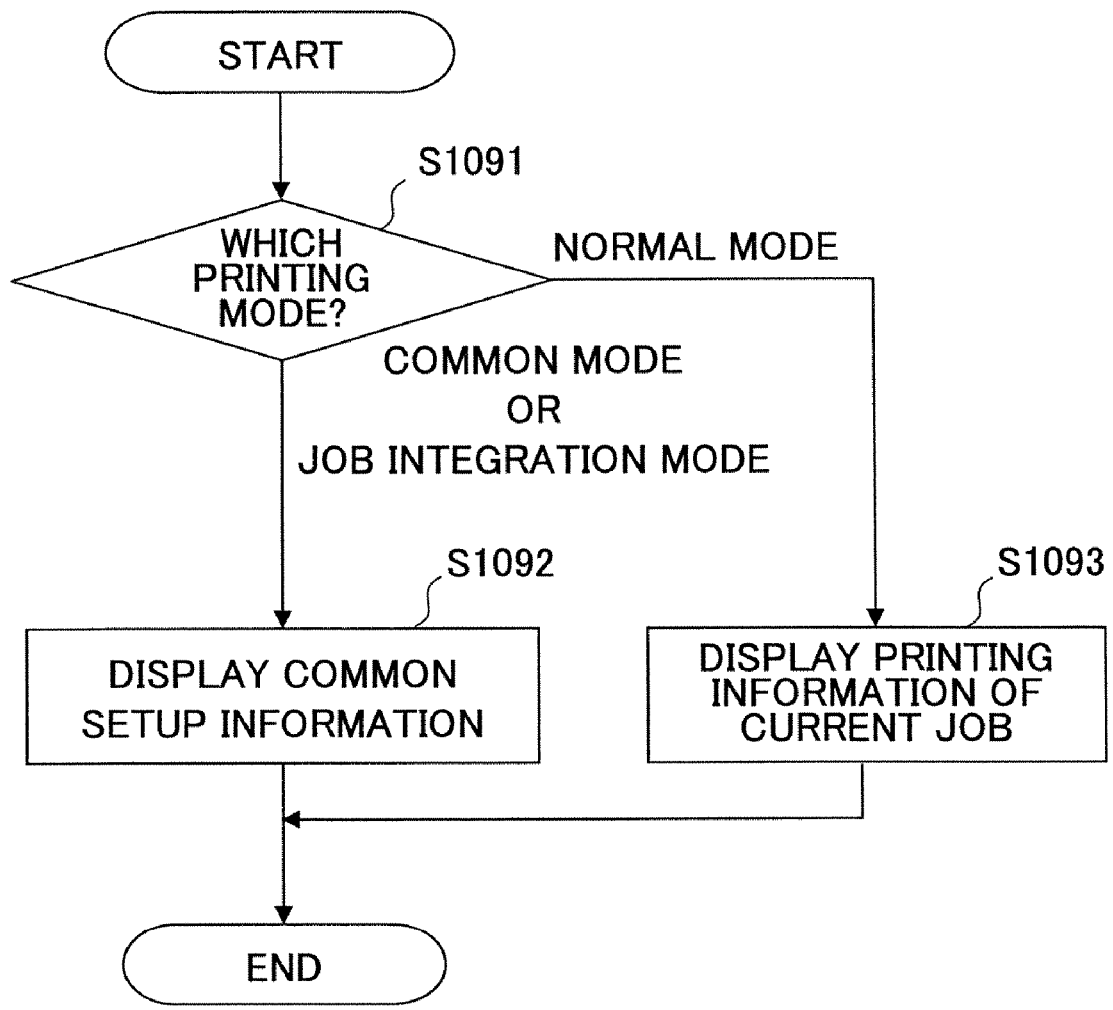
FIG. 10 is a flowchart of a display process of a basic setting area and a details setting area.

Next, a display process concerning the basic setting area and the details setting area is described with reference to FIG. 10.

At Step S1091, the UI unit 153 determines the printing mode (S1091). If the printing mode is determined to be one of the common setup mode and the job integration mode, the UI unit 153 applies the contents of the common setup information to the basic setting area 1502, the print setup tab 1504, and the like (S1092).

If, otherwise, the printing mode is determined to be the normal mode, the UI unit 153 applies the contents of the print setup information of the current job to the basic setting area 1502, the print setup tab 1504, and the like (S1093).

Pursuant to the process described above, the printing job management screen 150 is displayed. The user can change the print setup of the printing job, etc., in the printing job management screen 150.

Figure 11:
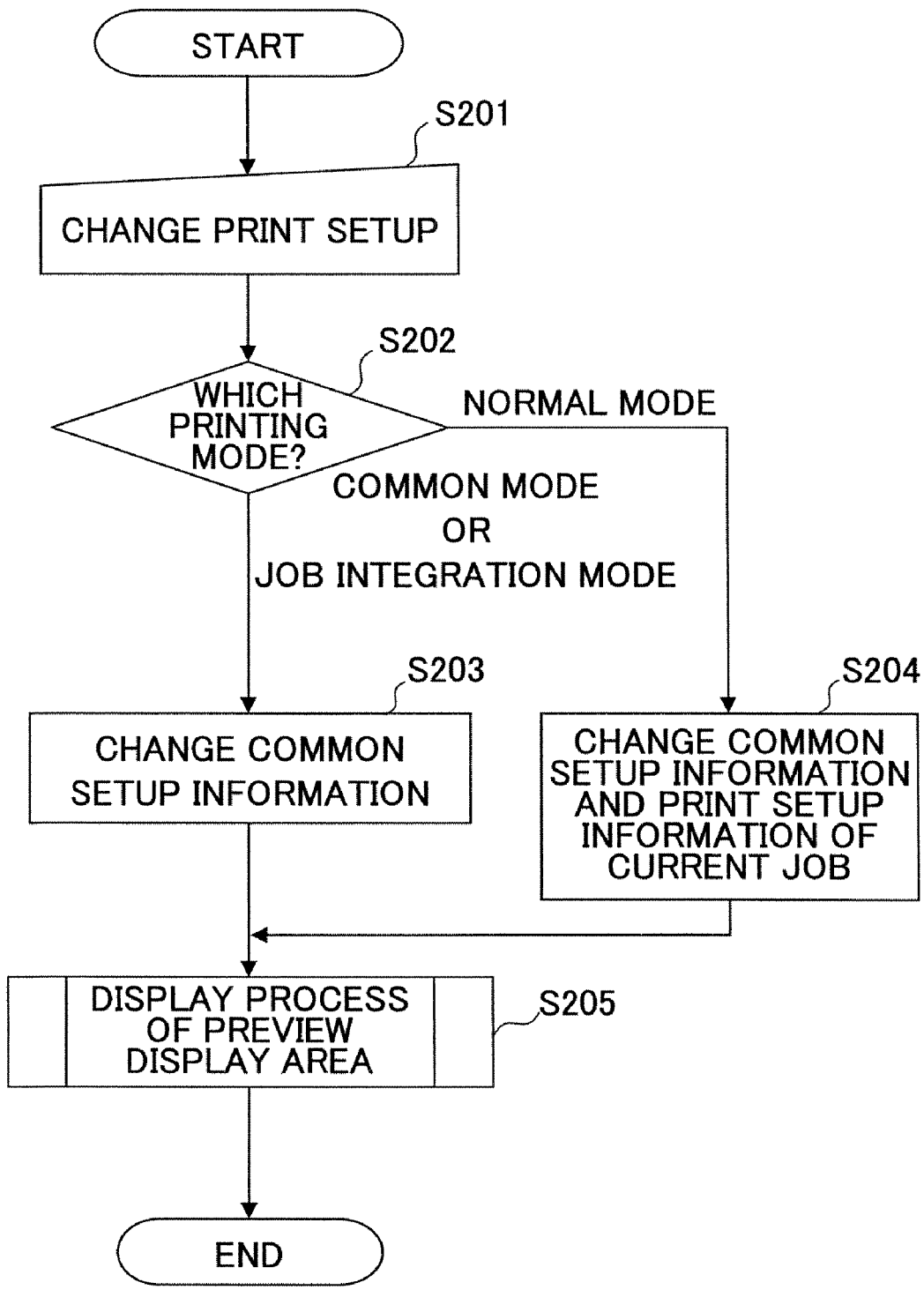
FIG. 11 is a flowchart of a process when the print setup is changed.

FIG. 11 is a flowchart of the process when the print setup is changed.

For example, if the print setup is changed in the print setup tab 1504 (S201), the print setup module 151 determines the printing mode, and performs the process according to the determined printing mode (S202). That is, when the printing mode is determined to be one of the common setup mode and the job integration mode, the print setup module 151 applies the contents of the change to the common setup information (S203).

On the other hand, if the printing mode is determined to be the normal mode, the print setup module 151 applies the contents of the change to the print setup information of the current job in the job list 1521 and the common setup information (S204).

Then, after carrying out one of S203 and S204, the UI unit 153 performs the display process of the preview display area 1501 (FIG. 9) at S205. In this way, the preview display area 1501 displays according to the change of the print setup.

Changes in the common setup information and the job list due to the process described above with reference to FIG. 11 are described.

FIG. 12 shows a change in the common setup information and the job list by a change in the print setup in one of the common setup mode and the job integration mode. FIG. 12 gives an example wherein punching is canceled and stapling is newly directed in the print setup tab 1504. As shown in FIG. 12, in the common setup mode and the job integration mode, only the common setup information 1511 is changed from "punch" to "stapling" while the print setup information of the printing job in the job list 1521 remains unchanged.

Changes on the display of the print setup screen 150 by the changes in the print setup shown in FIG. 12 are illustrated by FIG. 13A through FIG. 13F. The drawings show the cases wherein the printing mode is one of the common setup mode and the job integration mode.

Figure 13A:
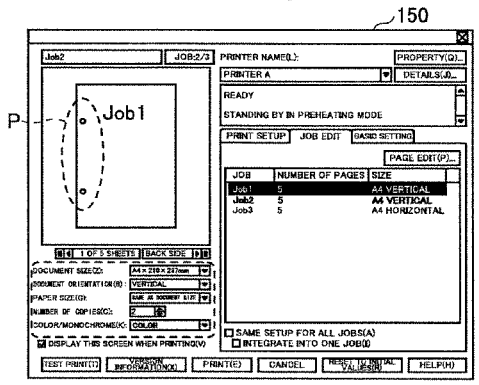
FIGS. 13A through 13F show changes on the display of the print setup screen when the print setup is changed in the common setup mode and the job integration mode.
Figure 13B:
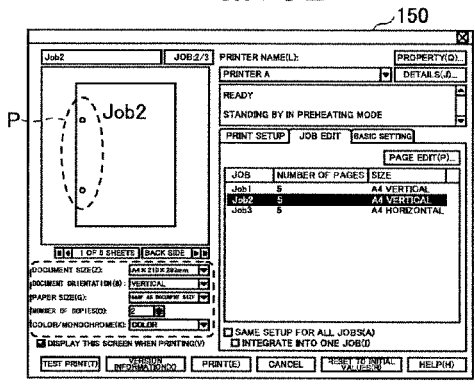
Figure 13C:
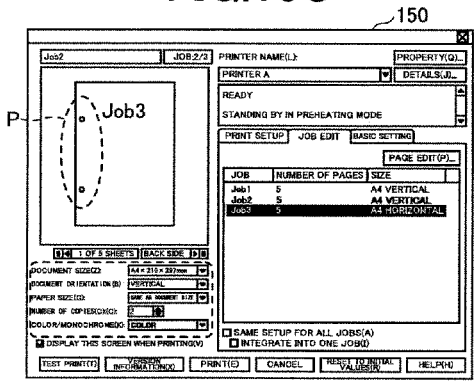
Figure 13D:
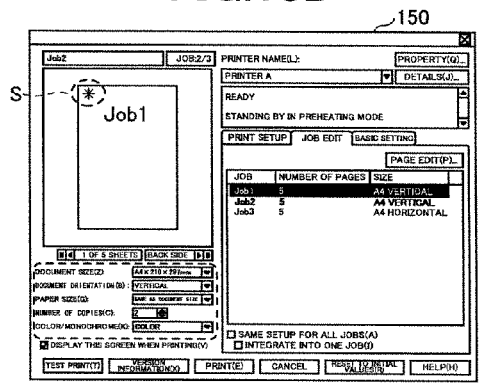
Figure 13E:
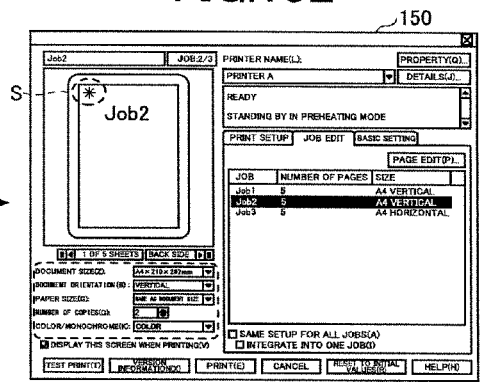
Figure 13F:
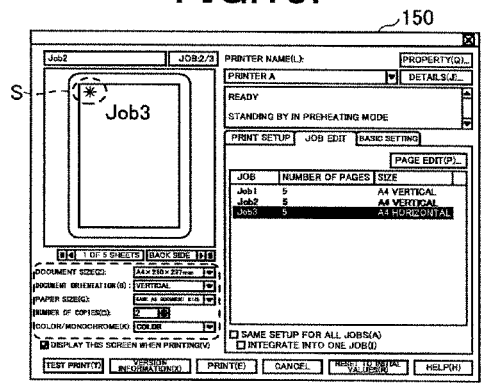

FIG. 13A and FIG. 13D show the case of Job1 before and after, respectively, of the change. FIG. 13B and FIG. 13E show the case of Job2 before and after, respectively, of the change. FIG. 13C and FIG. 13F show the case of Job3 before and after, respectively, of the change.

FIGS. 13A, 13B, and 13C show a sign P indicating that "punching" is directed based on the common setup information 1511 before the change of FIG. 12 takes place.

Further, FIGS. 13D, 13E, and 13F show a sign S indicating that "stapling" is directed based on the common setup information 1511 after the change of FIG. 12 takes place.

Figure 14:
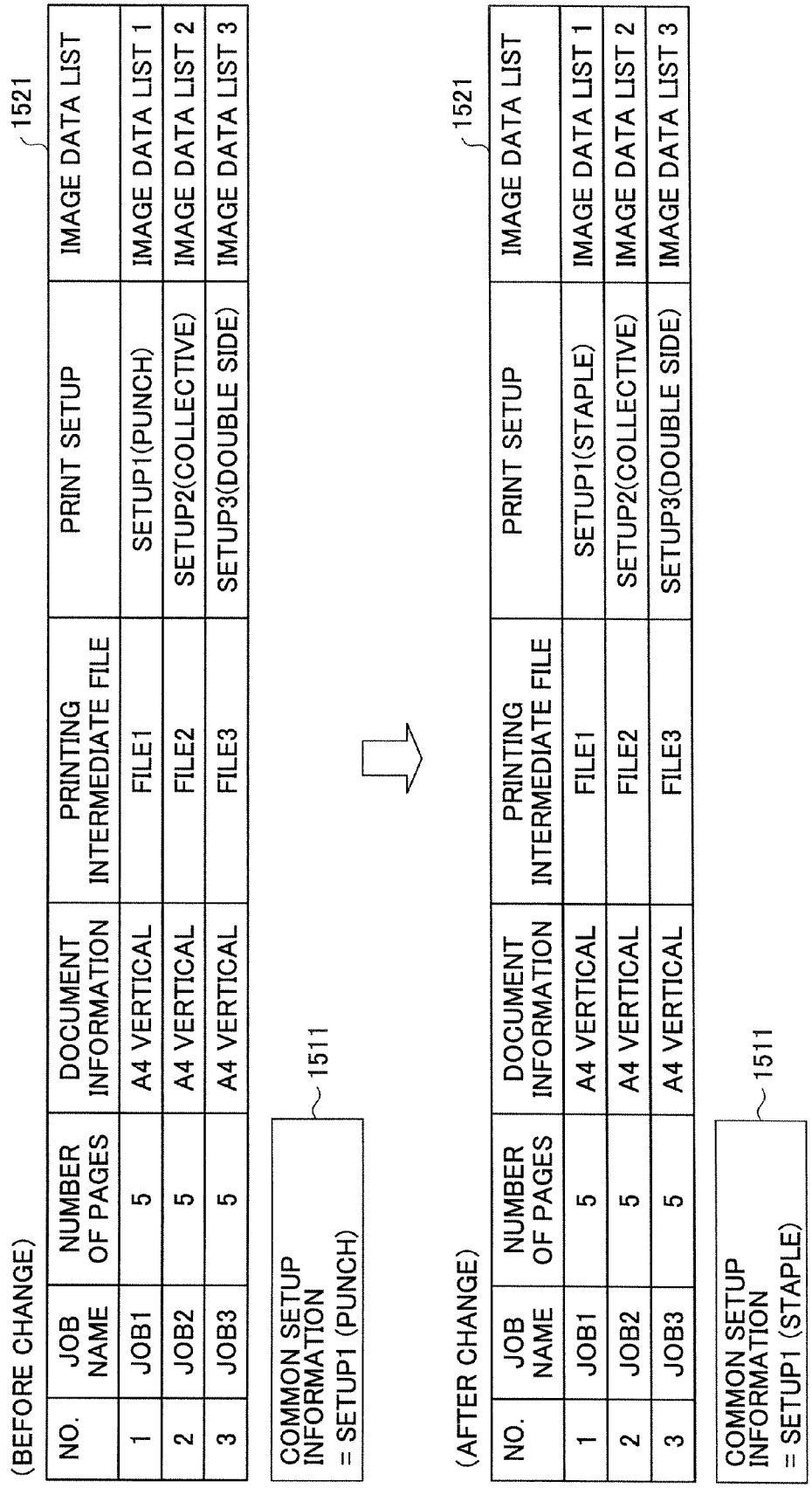
FIG. 14 gives tables showing changes of the job list and the common setup information when the print setup is changed in a normal mode.

Further, FIG. 14 shows changes in the job list and the common setup information by changing the print setup in the normal mode. FIG. 14 shows an example wherein "punching" is canceled and "stapling" is newly specified where Job1 is the current job. As shown in the drawing, in the case of the normal mode, the print setup of Job1 that is the current job is changed from "punching" to "stapling", and the same change is made to the common setup information 1511.

FIG. 15A through FIG. 15F show changes on the display of the print setup screen 150 due to the changes of the print setup shown in FIG. 14 (namely, the change of the print setup of Job1). The drawings show the case wherein the printing mode is the normal mode.

Figure 15A:
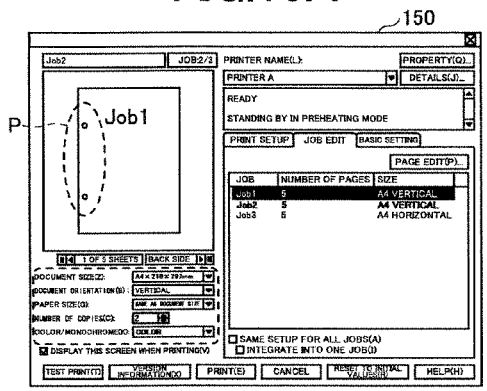
FIGS. 15A through 15F show changes on the display of the print setup screen when the print setup is changed in the normal mode.
Figure 15D:
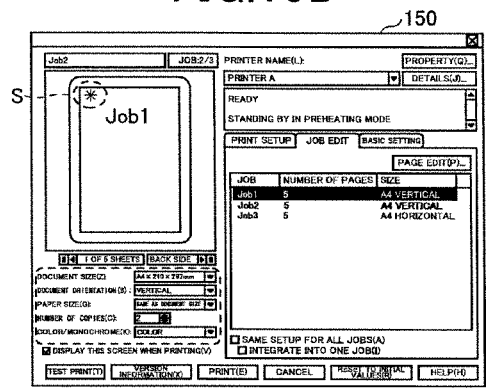
Figure 15B:
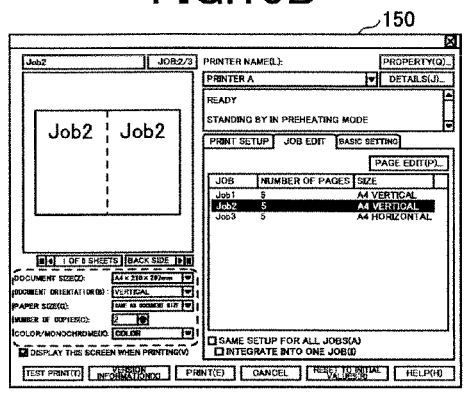
Figure 15E:
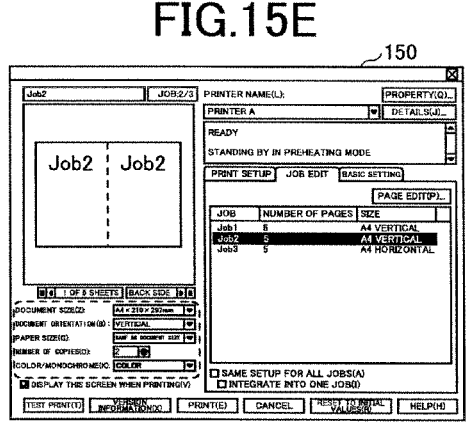
Figure 15C:
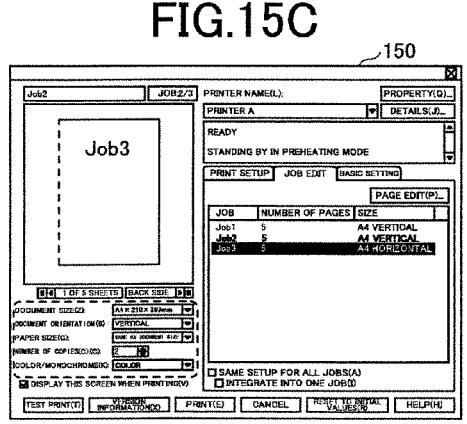
Figure 15F:
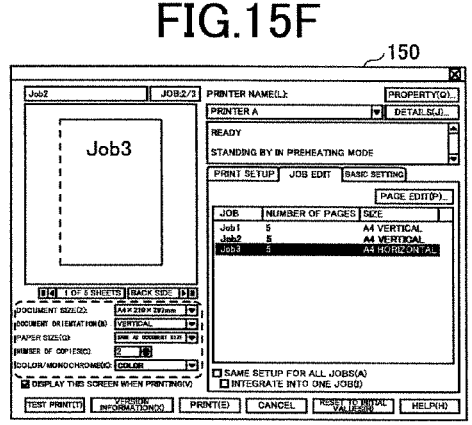

FIG. 15A and FIG. 15D show the case of Job1 before and after, respectively, of the change. FIG. 15B and FIG. 15E show the case of Job2 before and after, respectively of the change. FIG. 15C and FIG. 15F show the case of Job3 before and after, respectively, of the change. In the case of the normal mode, the preview display of each printing job is carried out based on the print setup information on the job list 1521, whether before or after the change. Accordingly, FIG. 15A shows the punch sign P being displayed for Job1; FIG. 15B shows how collective printing is to be carried out for Job2; and FIG. 15C shows a sign indicating double-side printing for Job3, although the illustration may be very fine and not clear.

Then, after the change, the display is changed only about Job1 that is the current job, and FIG. 15D displays the stapling sign S.

Figure 16:
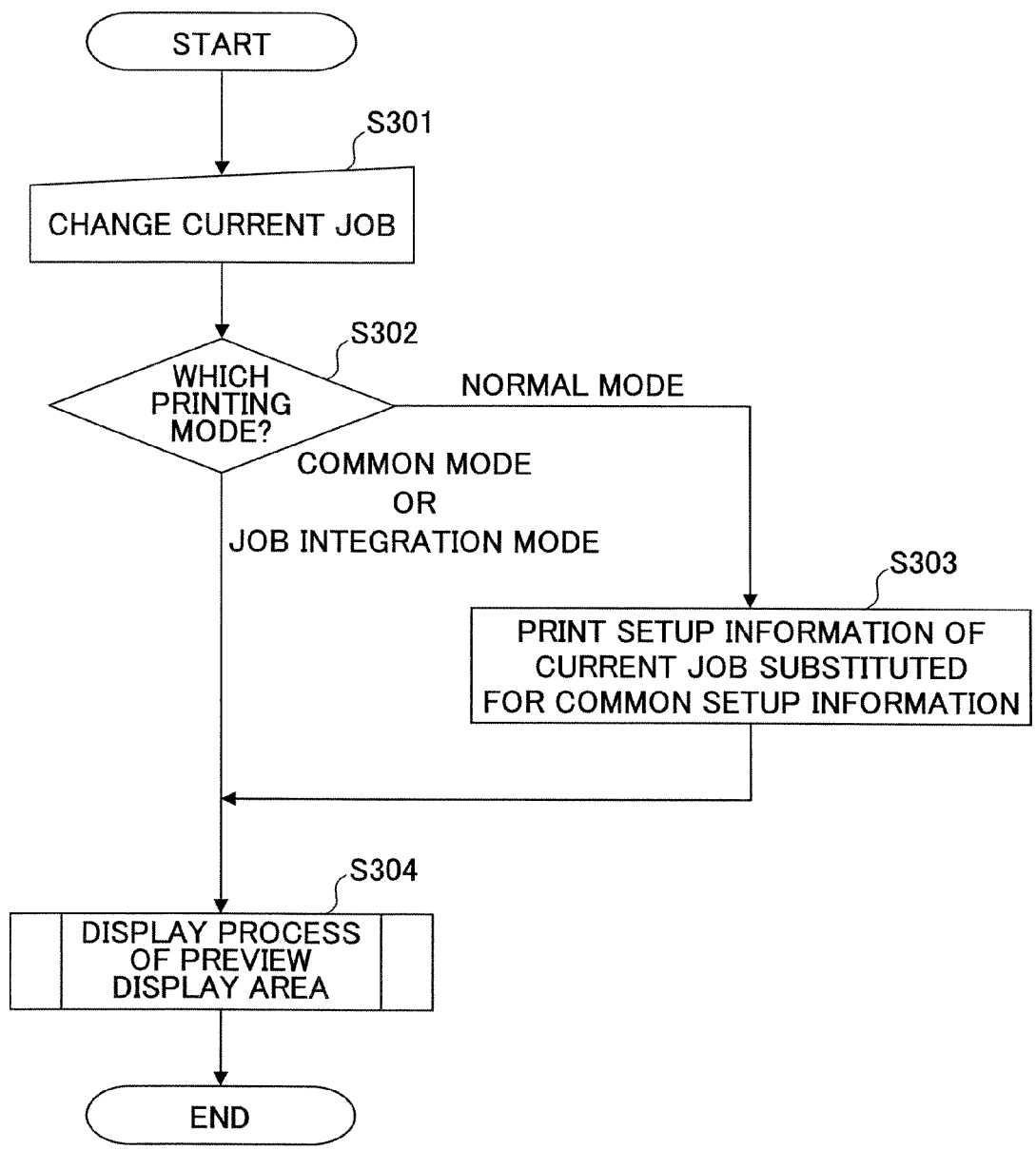
FIG. 16 is a flowchart of a process when a current job is changed.

Next, a process carried out when the current job is changed in the printing job management screen 150 is described. FIG. 16 is a flowchart of the process when the current job is changed.

For example, if the current job is changed by selecting a desired job in the job list display area 1505a of the job edit tab 1505 (S301), the UI unit 153 determines the printing mode (S302). If the print setup mode is determined to be one of the common setup mode and the job integration mode, the UI unit 153 performs the display process (FIG. 9) of the preview display area 1501 for the new current job (S304). Under the present circumstances, a preview is displayed using the common setup information that is used the last time.

In the case wherein the printing mode is determined to be the normal mode, the print setup module 151 acquires the print setup information of the new current job from the job list 1521, and substitutes for the common setup information (S303). Then, the UI unit 153 performs the display process of the preview display area 1501 for the new current job (S305).

Thus, when the current job is changed, only in the case of the normal mode is the common setup information changed.

In addition, if a direction to print a new document is issued by the application 11 where the printing job management screen 150 is displayed, a new printing job is added to the display object in the printing job management screen 150. In this case, the new printing job may be made the current job. In this case, the process of FIG. 16 is carried out.

Figure 17:
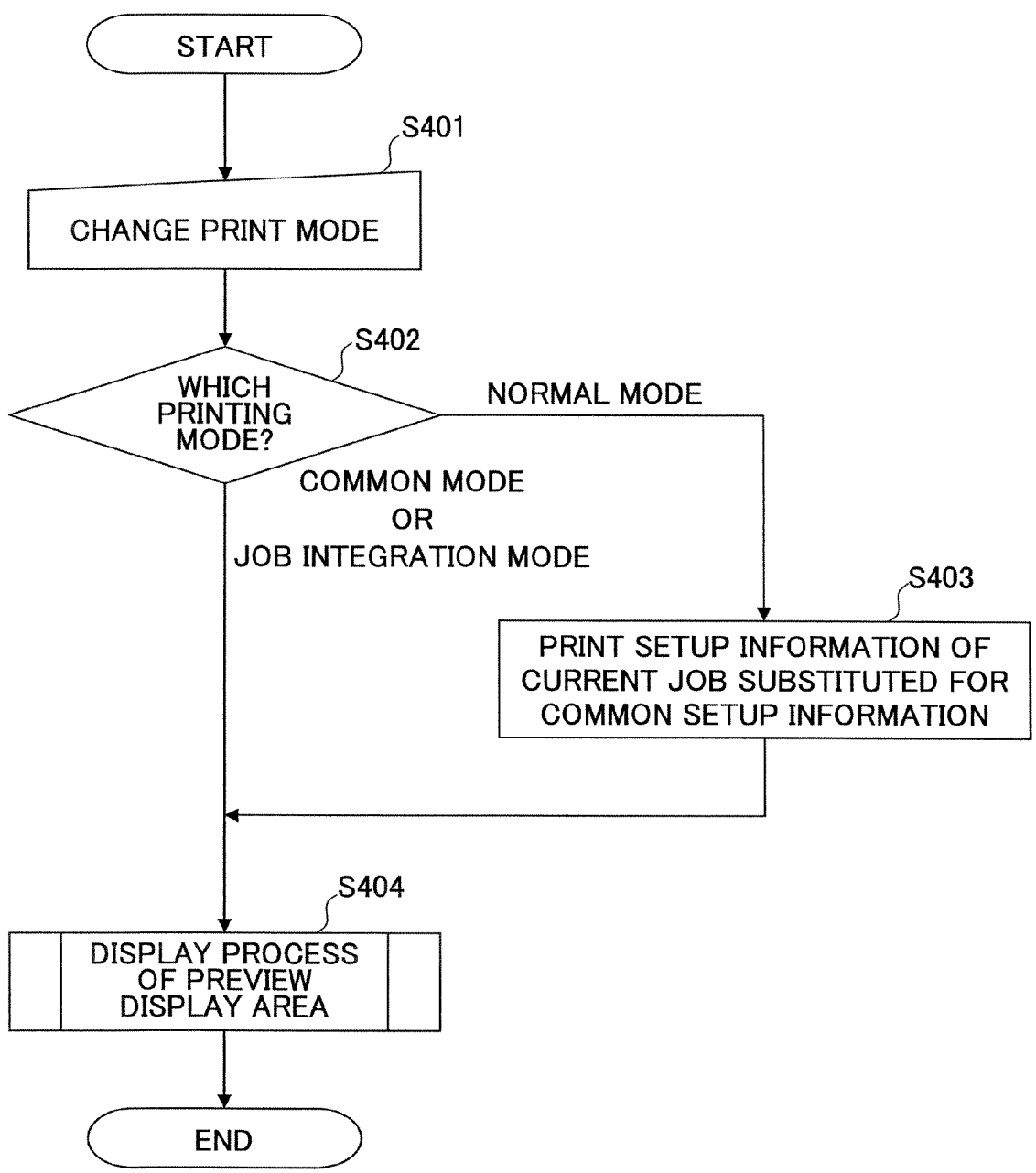
FIG. 17 is a flowchart of a process when a printing mode is changed.

Next, processing when the printing mode is changed is described. FIG. 17 is a flowchart of the process when the printing mode is changed.

If the printing mode is changed by clicking one of the common setup button 1505b and the job integration button 1505c (FIG. 6) (S401), a process according to the printing mode is performed (S402).

When the new printing mode is one of the common setup mode and the job integration mode, the display process (shown in FIG. 9) of the preview display area 1501 is performed by the UI unit 153 (S404). Therefore, for example, if the printing mode is changed into the common setup mode from the job integration mode, or if the printing mode is changed into the job integration mode from the common setup mode, the page number displayed in the preview display area 1501 and the total number of pages displayed on the page viewing area 1502 are changed.

On the other hand, when the new printing mode is the normal mode, the common setup information is substituted for the print setup information of each printing job of the job list 1521 by the print setup module 151 (S403), and then, the display process of the preview display area 1501 is performed by the UI unit 153 (S404).

That is, when changed into the normal mode, the print setup made in the common setup mode or the job integration mode, as applicable, is applied to all the printing jobs.

Behavior as described above is convenient to perform print setups that are almost the same for printing jobs. Because, in this way, operations are possible wherein values that are common to the printing jobs are set up in the common setup mode, then the printing mode is changed to the normal mode, and individual values are set up in the normal mode. Further, only by changing from the normal mode to the common setup mode, and then returning to the normal mode successively (namely, only by clicking the common setup specification button 1505b twice), the print setup information of the current job is applied to other printing jobs.

Nevertheless, the process of Step S403 is dispensable. If S403 is not provided, the print setup made in the common setup mode and the job integration mode is disregarded, and the print setup information on each printing job returns to the previous state.

Next, a printing process performed when a printing direction is issued on the printing job management screen 150 is described. FIG. 18 is a flowchart of the printing process.

When the printing button 1504 of the printing job management screen 150 is clicked, and a printing direction is issued, the printing process according to the printing mode is performed (S501).

When the printing mode is the common setup mode, the print setup module 151 generates a print setup command, e.g., in PJL based on the common setup information (S511). Then, the loop process is performed to every printing job. That is, the print setup module 151 merges the generated print setup command to the print setup information 162 of the printing intermediate file 16 concerning each printing job (S512). The printing intermediate file managing module 154 outputs the printing intermediate file 16, to which the print setup command has been merged, to the printer driver 13 (S513). In this way, in the case of the common setup mode, since the same print setup information included in the common setup information is applied to the printing intermediate file 16 of all the printing jobs, all the printing jobs are printed with the same print setup as for the setting item by that are set up in common.

In the case wherein the printing mode is the job integration mode, the print setup module 151 generates a print setup command, e.g., in PJL based on the common setup information (S521). Then, the printing intermediate file managing module 154 combines the printing intermediate file 16 of all the printing jobs, and generates one printing intermediate file

16 (S522). In more detail, the header information 161 and the print setup information 162 of each printing intermediate file 16 are merged such that there are no contradictions, and then, the drawing information 163 is united.

Then, the print setup module 151 merges the generated print setup command with the print setup information 162 of the printing intermediate file 16 that has been united (S523). Then, the printing intermediate file managing module 154 outputs the printing intermediate file 16 that has been united and the print setup command having been merged to the printer driver 13 (S524). In this way, since the printing intermediate files 16 of the printing jobs are united into one printing intermediate file 16 in the case of job integration mode, the printing process is performed as one printing job henceforth. Accordingly, the process of, for example, stapling and collective printing, is carried out as one document.

Furthermore, in the case where the printing mode is the normal mode, the print setup module 151 generates a print setup command for each printing job based on the print setup of the corresponding printing job in the job list 1521 (S531). Then, the loop process of the printing job is performed. That is, the print setup module 151 merges the print setup command generated for each printing job with the print setup information 162 on the printing intermediate file 16 of the corresponding printing job (S532). Then, the printing intermediate file managing module 154 outputs the printing intermediate file 16 of the printing job to the printer driver 13 (S533). Thus, in the case of the normal mode, since the common setup information is not applied to each printing job and the printing intermediate files 16 are not united, the printing process according to the print setup information is performed for the corresponding printing job.

In all the cases of the printing mode, the printer driver 13 that receives the printing intermediate file 16 from the printing intermediate file managing module 154 generates printing data (data in the PDL form that can be interpreted by the printer 20) based on the printing intermediate file 16.

In addition, the host computer 10 is described above as being directly operated by the user; however, the host computer 10 may be a separate entity, such as a printer server, that controls the printing process of document data specified by a request issued by the PC of the user.

According to the host computer 10 of the embodiment of the present invention, the print setup work for two or more printing jobs is simplified as described above.

That is, when printing two or more documents, it is often desired to apply the same print setup to all the documents. However, the work required in setting up the same print setup for all the documents one-by-one is time consuming, and an error may creep in. With the printing job management screen 150 according to the embodiment, the user can apply the same print setup to all the documents while visually verifying the setup. Further, although it is conventionally possible to apply the same setup to an integrated printing job that is constituted by two or more printing jobs, the printing job cannot be edited (turn exchange, etc.) after the printing jobs are integrated. With the print setup screen 150 according to the embodiment, it is possible to apply a common setup to all printing jobs, while each printing job can be edited.

Further, when two or more documents are to be printed, and collectively stapled, conventionally, the documents have to be stored as a printing intermediate file, i.e., this requires disruption in a series of work flow. However, according to the embodiment of the present invention, two or more documents can be output as one document in one series of work flow steps of printing from an application, allowing the user to visually check the print setup screen 150. Further, two or more printing jobs can be united, while each printing job can be edited.

Further, the present invention is not limited to these embodiments, but variations and modifications may be made without departing from the scope of the present invention.

The present application is based on Japanese Priority Application No. 2005-077641 filed on Mar. 17, 2005 with the Japanese Patent Office, the entire contents of which are hereby incorporated by reference.

What is claimed is:

1. A print control system comprising:

a print control apparatus configured to convert document data generated by an application into printing intermediate data, configured to convert the printing intermediate data into print data in a printer-processable form, and configured to generate an instruction for printing the print data; and a printing apparatus configured to print the print data based on the instruction for printing the print data, wherein the print control apparatus includes:

(1) a print setting unit configured to set print setting information;

(2) a converting unit configured to convert the document data into the printing intermediate data based on the print setting information;

(3) a display unit configured to display information indicating the printing intermediate data converted by the converting unit;

(4) a processing unit configured to process the printing intermediate data corresponding to a selection of the information indicating the printing intermediate data, by combining, editing, and/or deleting the printing intermediate data;

(5) a preview display unit configured to display a preview of the printing intermediate data processed by the processing unit;

(6) a changing unit configured to change an after-process of the print setting information set by the print setting unit;

(7) a print preview display control unit configured to display a page of the preview based on the after-process of the print setting information that is changed by the changing unit; and (8) an instructing unit configured to instruct the printing apparatus to print the print data obtained by converting the printing intermediate data into the printer-processable format, using a print setting for printing the page of the preview based on the after-process of the print setting information that is changed by the changing unit, wherein the printing apparatus prints the print data based on an instruction from the instructing unit, wherein the print preview display control unit of the printing apparatus includes: a first print setting management unit to manage the print setting information of each set of the printing intermediate data that is an object of display at the preview display unit, and a second print setting management unit to manage the print setting information concerning a common setup, wherein, if the common setup is selected in the preview display unit, a change of the print setting in a setup screen is reflected by the second print setup management unit, and wherein, if the common setup is not selected in the preview display unit, a change of the print setup of each set of the printing intermediate data that is an object of display at the preview display unit is reflected by the first print setup management unit, and wherein the information indicating the printing intermediate data includes a plurality of items of information, which include a file name or a number of pages of the document data generated by the application, and wherein a printing mode includes a common setup mode, a job integration mode, and a normal mode, the common setup mode being a mode in which the common setup is applied to printing jobs that are separate from one another, the job integration mode being a mode in which printing jobs are integrated into one printing job, and the normal mode being a mode in which a printing-job-specific setup is applied to each printing job, and wherein the common setup made by the second print setting management unit is employed in both the common setup mode and the job integration mode.

2. The print control system according to claim 1, wherein the converting unit is configured to convert the document data generated by the application into drawing data, and configured to convert the drawing data into the printing intermediate data.

3. The print control system according to claim 1, wherein the information indicating the printing intermediate data includes a plurality of items of information.

4. The print control system according to claim 1, further comprising a storage unit configured to store print setting information, wherein, if the change of the print setting in regard to the print preview is selected via the preview display unit, the print preview display control unit changes only a portion of the print setting information stored in the storage unit.

5. A print control apparatus that can be connected to a printing apparatus, the print control apparatus comprising:
(1) a print setting unit configured to set print setting information;
(2) a converting unit configured to convert document data generated by an application into printing intermediate data based on the print setting information;
(3) a display unit configured to display information indicating the printing intermediate data generated by the converting unit;
(4) a processing unit configured to process the printing intermediate data corresponding to a selection of the information indicating the printing intermediate data, by combining, editing, and/or deleting the printing intermediate data;
(5) a preview display unit configured to display a preview of the printing intermediate data processed by the processing unit;
(6) a changing unit configured to change an after-process of the print setting information set by the print setting unit;
(7) a print preview display control unit configured to display a page of the preview based on the after-process of the print setting information that is changed by the changing unit; and
(8) an instructing unit configured to instruct the printing apparatus to print print data that is obtained by converting the printing intermediate data into the print data in a printer-processable form, using a print setting for printing the page of the preview based on the after-process of the print setting information that is changed by the changing unit, wherein the print preview display control unit of the printing apparatus includes: a first print setting management unit to manage the print setting information of each set of the printing intermediate data that is an object of display at the preview display unit, and a second print setting management unit to manage the print setting information concerning a common setup, wherein, if the common setup is selected in the preview display unit, a change of the print setting in a setup screen is reflected by the second print setup management unit, and wherein, if the common setup is not selected in the preview display unit, a change of the print setup of each set of the printing intermediate data that is an object of display at the preview display unit is reflected by the first print setup management unit, and wherein the information indicating the printing intermediate data includes a plurality of items of information, which include a file name or a number of pages of the document data generated by the application, and wherein a printing mode includes the common setup mode, a job integration mode, and a normal mode, the common setup mode being a mode in which a common setup is applied to printing jobs that are separate from one another, the job integration mode being a mode in which printing jobs are integrated into one printing job, and the normal mode being a mode in which a printing-job-specific setup is applied to each printing job, and wherein the common setup made by the second print setting management unit is employed in both the common setup mode and the job integration mode.

6. The print control apparatus according to claim 5, wherein the converting unit is configured to convert the document data generated by the application into drawing data, and configured to convert the drawing data into the printing intermediate data.

7. The print control apparatus according to claim 5, wherein the information indicating the printing intermediate data includes a plurality of items of information.

8. The print control apparatus according to claim 5, further comprising a storage unit configured to store print setting information, wherein, if the change of the print setting in regard to the print preview is selected via the preview display unit, the print preview display control unit changes only a portion of the print setting information stored in the storage unit.

9. A non-transitory computer-readable recording medium storing a print control program which, when executed by a print control apparatus that can be connected to a printing apparatus, causes the print control apparatus to function as:
(1) a print setting unit configured to set print setting information;
(2) a converting unit configured to convert document data generated by an application into printing intermediate data based on the print setting information;
(3) a display unit configured to display information indicating the printing intermediate data generated by the converting unit;
(4) a processing unit configured to process the printing intermediate data corresponding to a selection of the information indicating the printing intermediate data, by combining, editing, and/or deleting the printing intermediate data;
(5) a preview display unit configured to display a preview of the printing intermediate data processed by the processing unit;
(6) a changing unit configured to change an after-process of the print setting information set by the print setting unit;

(7) a print preview display control unit configured to display a page of the preview based on the after-process of the print setting information that is changed by the changing unit; and
(8) an instructing unit configured to instruct the printing apparatus to print print data that is obtained by converting the printing intermediate data into the print data in a printer-processable form, using a print setting for printing the page of the preview based on the after-process of the print setting information that is changed by the changing unit, wherein the print preview display control unit of the printing apparatus includes: a first print setting management unit to manage the print setting information of each set of the printing intermediate data that is an object of display at the preview display unit, and a second print setting management unit to manage the print setting information concerning a common setup, wherein, if the common setup is selected in the preview display unit, a change of the print setting in a setup screen is reflected by the second print setup management unit, and wherein, if the common setup is not selected in the preview display unit, a change of the print setup of each set of the printing intermediate data that is an object of display at the preview display unit is reflected by the first print setup management unit, and wherein the information indicating the printing intermediate data includes a plurality of items of information, which include a file name or a number of pages of the document data generated by the application and wherein a printing mode includes the common setup mode, a job integration mode, and a normal mode, the common setup mode being a mode in which a common setup is applied to printing lobs that are separate from one another, the job integration mode being a mode in which printing jobs are integrated into one printing job, and the normal mode being a mode in which a printing-job-specific setup is applied to each printing job, and wherein the common setup made by the second print setting management unit is employed in both the common setup mode and the job integration mode.

10. The non-transitory computer-readable recording medium according to claim 9, wherein the converting unit is configured to convert the document data generated by the application into drawing data, and configured to convert the drawing data into the printing intermediate data.

11. The non-transitory computer-readable recording medium according to claim 9, wherein the information indicating the printing intermediate data includes a plurality of items of information.

12. The non-transitory computer-readable recording medium according to claim 9, further comprising a storage unit configured to store print setting information, wherein, if the change of the print setting in regard to the print preview is selected via the preview display unit, the print preview display control unit changes only a portion of the print setting information stored in the storage unit.

* * * * *